United States Patent
Chergui (10) Patent No.: US 10,518,365 B2
(45) Date of Patent: Dec. 31, 2019

(54) JOINING USING AUXILIARY JOINING ELEMENTS

(71) Applicants: ThyssenKrupp Steel Europe AG, Duisburg (DE); ThyssenKrupp AG, Essen (DE)

(72) Inventor: Azeddine Chergui, Dortmund (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 428 days.

(21) Appl. No.: 15/227,655

(22) Filed: Aug. 3, 2016

(65) Prior Publication Data

US 2017/0036312 A1   Feb. 9, 2017

(30) Foreign Application Priority Data

Aug. 4, 2015 (DE) .......... 10 2015 112 770

(51) Int. Cl.
*B23K 37/04* (2006.01)
*B23K 11/16* (2006.01)
(Continued)

(52) U.S. Cl.
CPC ............. *B23K 37/04* (2013.01); *B21J 15/025* (2013.01); *B23K 11/14* (2013.01); *B23K 11/16* (2013.01);
(Continued)

(58) Field of Classification Search
CPC ........ B23P 19/001; B23P 19/06; B23K 11/16; B23K 11/00; B23K 37/04; B21J 15/30; B29C 65/60
See application file for complete search history.

(56) References Cited

U.S. PATENT DOCUMENTS

| | | | |
|---|---|---|---|
| 3,036,672 A * | 5/1962 | Kohl | B21D 47/00 108/56.1 |
| 2002/0098053 A1* | 7/2002 | Zubko | B62D 29/045 410/115 |

(Continued)

FOREIGN PATENT DOCUMENTS

| | | |
|---|---|---|
| CN | 2105415 U | 5/1992 |
| CN | 2222075 Y | 3/1996 |

(Continued)

OTHER PUBLICATIONS

English Language Abstract for DE10 2011 100 495 A1.

*Primary Examiner* — Jeffry H Aftergut
*Assistant Examiner* — Jaeyun Lee
(74) *Attorney, Agent, or Firm* — Lathrop Gage L.L.P.

(57) ABSTRACT

Methods and devices for joining a composite panel, which may comprise a non-metallic intermediate layer disposed between two external metallic cover layers, to a further component are disclosed. The composite panel and the further component may be disposed so as to at least partially overlap. The object of economically and reliably joining composite panels may be achieved in that by way of a positioning unit, at least one auxiliary joining element is brought to bear on the composite panel and is fixed to the composite panel. The composite panel in a region of the at least one auxiliary joining element may be subsequently joined to the further component.

15 Claims, 7 Drawing Sheets

(51) Int. Cl.
  *B32B 7/12* (2006.01)
  *B32B 15/08* (2006.01)
  *B21J 15/02* (2006.01)
  *B23P 19/04* (2006.01)
  *B32B 15/18* (2006.01)
  *B32B 15/20* (2006.01)
  *B23K 11/14* (2006.01)
  *B23K 11/18* (2006.01)
  *B23K 101/18* (2006.01)
  *B23K 103/16* (2006.01)
  *F16B 11/00* (2006.01)
  *F16B 5/02* (2006.01)
  *F16B 5/04* (2006.01)
  *F16B 5/08* (2006.01)
  *B23K 101/00* (2006.01)
  *B23K 103/04* (2006.01)
  *B23K 103/10* (2006.01)

(52) U.S. Cl.
  CPC ............ *B23K 11/185* (2013.01); *B23P 19/04* (2013.01); *B32B 7/12* (2013.01); *B32B 15/08* (2013.01); *B32B 15/18* (2013.01); *B32B 15/20* (2013.01); *B23K 2101/006* (2018.08); *B23K 2101/18* (2018.08); *B23K 2103/04* (2018.08); *B23K 2103/10* (2018.08); *B23K 2103/172* (2018.08); *B32B 2307/732* (2013.01); *B32B 2605/08* (2013.01); *B32B 2607/00* (2013.01); *F16B 5/02* (2013.01); *F16B 5/04* (2013.01); *F16B 5/08* (2013.01); *F16B 11/006* (2013.01)

(56) References Cited

U.S. PATENT DOCUMENTS

| | | | |
|---|---|---|---|
| 2003/0167620 A1* | 9/2003 | Wang | B21J 15/025 29/525.06 |
| 2005/0268453 A1* | 12/2005 | Haas | B21J 15/043 29/524.1 |
| 2014/0224774 A1 | 8/2014 | Chergui | |
| 2016/0045977 A1* | 2/2016 | Chergui | B23K 11/004 219/91.21 |
| 2017/0154866 A1* | 6/2017 | Fathi | H01L 24/83 |

FOREIGN PATENT DOCUMENTS

| | | |
|---|---|---|
| CN | 1708374 A | 12/2005 |
| CN | 2762959 Y | 3/2006 |
| CN | 102079076 A | 6/2011 |
| CN | 104564949 A | 4/2015 |
| CN | 203839398 U | 4/2015 |
| CN | 204321074 U | 5/2015 |
| CN | 204461405 U | 7/2015 |
| DE | 3210310 A | 9/1983 |
| DE | 297 02 834 U1 | 6/1997 |
| DE | 102010061502 A | 1/2012 |
| DE | 10 2011 100 495 A1 | 11/2012 |
| DE | 102011052110 A | 1/2013 |
| DE | 102012102286 A | 9/2013 |
| DE | 102012106521 A | 1/2014 |
| JP | S60210374 A | 10/1985 |
| JP | H07-171687 A | 7/1995 |

* cited by examiner

JOINING USING AUXILIARY JOINING ELEMENTS

CROSS REFERENCE TO RELATED APPLICATION

This application claims priority to German Patent Application No. DE 10 2015 112 770.9, which was filed on Aug. 4, 2015 and as translated is entitled "Joining Using Auxiliary Joining Elements," which is hereby incorporated by reference in its entirety.

FIELD

The present disclosure relates to methods and devices for joining composite panels to other components.

BACKGROUND

Composite panels are composite materials that in particular are constructed in the form of a sandwich, and to this extent are also referred to as sandwich panels. Composite panels in most instances are composed of two external cover layers or panels and one plastics layer disposed between the cover layers. By way of the layer construction of the composite panels the latter may have properties that could not or could hardly be achieved by one component of a homogenous material. For example, composite panels may have very high localized rigidity and strength. Moreover, composite panels may provide good properties in terms of sound damping. Not least, composite panels, however, also permit a lower component weight without deficits in terms of the other properties of the component having to be accepted. For this reason, composite panels are increasingly being used as so-called lightweight panels in automotive manufacturing.

It is disadvantageous here that the composite panels are only to a limited extent suitable for the joining methods widely used in automotive manufacturing, such as resistance welding. Resistance welding is employed, for example, in order to connect the composite panels in a simple and cost-effective manner to other components. In the case of resistance welding there is a brief, intense input of heat into the composite panel, on account of which the at least one non-metallic layer disposed between the cover layers may easily be damaged. This is especially the case with plastics layers that have lower resistance to temperature and lower thermal conductivity than the external cover layers. Moreover, the plastics layers may be electrically isolating and/or have very low electrical conductivity.

The use of composite panels may also be problematic in the case of mechanical joining methods because, for example, the individual layers of the composite panel may separate or yield due to the mechanical joining methods, so that reliable joining in a secure process is no longer possible.

The unexamined and first German Patent Publication No. DE 10 2011 100 495 A1 proposes so-called dummy elements for use particularly in the case of resistance welding. The dummy elements may be fixed in a receptacle that encompasses the dummy elements and may be positioned on the composite panel. In the joining procedure, the dummy element may also be welded by way of welding tongs. In principle, it is also conceivable for the dummy elements to be adhesively bonded.

This approach enables the welding procedure to be influenced by the use of dummy elements, but the former is associated with comparatively high complexity. First, the dummy elements have to be held in the correct position by way of the receptacle until the actual welding process takes place, increasing the risk of incorrect positioning. If the dummy elements are adhesively bonded, this necessitates an additional manual operational step for adhesive bonding, which is time intensive and which has to be followed by establishing contact between the dummy element and the receptacle, and additionally by establishing contact between the dummy element and the welding tongs. Accordingly, the method is not economical due to the individual method steps.

Therefore, a need exists for refined methods and devices for economically and reliably joining composite panels.

DETAILED DESCRIPTION

The present disclosure generally concerns methods and devices for joining composite panels, which in many cases comprise two external metallic cover layers and an interdisposed non-metallic intermediate layer, to at least one further component. The composite panel and the further component typically partially overlap one another. To that end, in some examples at least one auxiliary joining element may be brought to bear on a composite panel by way of a positioning unit and may be fixed to the composite panel, and the composite panel in a region of the at least one auxiliary joining element may be subsequently joined to a further component.

Support of the parts to be joined may be provided by the at least one auxiliary joining element in the joining region, in some cases, at points that are particularly stressed in a localized manner. Contrary to the prior art, however, on account of a positioning unit being provided that not only brings the auxiliary joining element or auxiliary joining elements, respectively, to bear on the composite panel but also fixes the former to the latter, positioning and fixing of auxiliary joining elements may be carried out not only very efficiently but also very accurately. Following the accurate positioning and fixing, the parts to be joined may be arbitrarily positioned without the risk of slippage, for example. Auxiliary joining elements may likewise advantageously also be accurately positioned on a lower side of the parts to be joined in this manner. A plurality of auxiliary joining elements may likewise advantageously be positioned and fixed in this manner.

An auxiliary joining element may in some cases be an additional element that supports the joining procedure. In particular, the auxiliary joining element may have various designs, depending at least in part on the joining method to be carried out. Thus, those having ordinary skill in the art will understand that various materials and geometries may be employed for all elements identified herein. To that end, in some examples the auxiliary joining element may be configured so as to be substantially flat and/or round. For example, the auxiliary joining element may be configured in a disc shape or a plate shape. For example, the auxiliary joining element may include metal (steel, for example) or be composed thereof, and in particular be electrically conductive. For example, the auxiliary joining element has material properties (such as a dissimilar electrical conductivity and/or a dissimilar strength) that are comparable or dissimilar to the cover layers of the composite panel.

In some cases, a positioning unit may be a device or a system that may position auxiliary joining elements in an automated manner in space and that may also impinge said auxiliary joining elements with a force, for example push the auxiliary joining elements against the composite panel, in order for the auxiliary joining elements to be fixed for instance. To this end, the positioning unit may comprise a plurality of parts, such as a robotic arm, a tongs element, and/or a receptacle for the auxiliary joining elements.

Fixing an auxiliary joining element to the composite panel may involve connecting the auxiliary joining element to the composite panel. For example, the auxiliary joining element may be connected directly to the composite panel.

For example, one or both cover layers of the composite panel may be composed of steel, for example of carbon steel or stainless steel, but the use of aluminum and/or magnesium is also possible. One or both cover layers may have a thickness of less than 1 mm, a thickness of 0.1 to 0.5 mm, or a thickness of 0.2 to 0.3 mm, for example. The cover layers may be of identical design or of dissimilar design, for example. The intermediate layer may be, for example, composed of plastics, for example, a thermoplastics material. For example, the intermediate layer also has a thickness of less than 2 mm, a thickness of 0.2 to 1.5 mm, or a thickness of about 0.4 mm, for instance.

The further component may be a solid panel, for example, or likewise be a composite panel. In the case of the latter the explanations made in the context of the composite panel may apply in a corresponding manner. Yet further components that are joined to the composite panel and/or to the further component simultaneously or in a separate step may likewise be provided. The composite panel may be joined to precisely one further component.

Due to the arrangement of the composite panel and of the further component the two latter then overlap in an overlap region in which the at least one auxiliary joining element may be disposed.

In principle, one or more auxiliary joining elements may also be brought to bear on the further component and be fixed to the further component. The explanations given above may also apply in a corresponding manner.

After joining, the at least one auxiliary joining element may remain on the joined parts, for example, may remain connected thereto. Alternatively, however, in other examples the at least one auxiliary joining element may be removed from the joined parts again.

In some example methods, the at least one auxiliary joining element may be fixed to the composite panel in such a manner that a form-fitting and/or force-fitting connection between the at least one auxiliary joining element and the composite panel is created. Fixing of the at least one auxiliary joining element may thus be achieved by way of the form-fitting and/or force-fitting connection. On account thereof, particularly simple fixing of the auxiliary joining element to the composite panel is enabled, permitting accurate positioning of the auxiliary joining element during subsequent joining with low temporal effort. For example, the at least one auxiliary joining element needs only to be impinged with force by the positioning unit, and to be pushed against the composite panel. Alternatively or additionally, a materially integral connection is also possible. If one or a plurality of auxiliary joining elements is/are also fixed to the further component these explanations may apply thereto in a corresponding manner.

In some example methods, the at least one auxiliary joining element may be fixed to the composite panel by way of one or of a plurality of fixing elements that is/are disposed on that respective side of said auxiliary joining element that faces the composite panel. On account thereof, a force-fitting and/or form-fitting connection between the respective auxiliary joining element and the composite panel in particular may be implemented in a simple manner. For example, the fixing elements may be provided in the form of protrusions, spikes and/or hooks. For example, the fixing elements penetrate at least or exclusively that (outer) cover layer that faces the respective auxiliary joining element. For example, the fixing elements penetrate the composite panel at least up to the intermediate layer thereof. If one or a plurality of auxiliary joining elements is/are also fixed to the further component, these explanations may apply thereto in a corresponding manner.

In some example methods, the positioning unit for fixing the at least one auxiliary joining element comprises a positioning arm and/or a tongs. On account thereof, positioning and fixing the at least one auxiliary joining element may be performed efficiently and in a reliable process. For example, the tongs may be configured in such a manner that the former may encompass the composite panel and the further component disposed in an overlapping manner. In this manner, auxiliary joining elements may be disposed on both sides, namely, on the side of the composite panel and on the side of the further component. The tongs may also be configured to push auxiliary joining elements onto the composite panel, so as to fix said auxiliary joining elements thereto. A positioning arm, for example a robotic arm, may be provided in particular for moving and controlling the tongs. It is likewise possible, for example, for auxiliary joining elements to be positioned directly on the composite panel, using the robotic arm. If one or a plurality of auxiliary joining elements are also fixed to the further component these explanations apply thereto in a corresponding manner.

In some example methods, the positioning unit receives the at least one auxiliary joining element to be fixed from an infeed system. By providing an infeed system, the auxiliary joining elements may be provided to the positioning unit in a simple and rapid manner and be reliably transferred to the latter, further enhancing the efficiency and reliability of the method. For example, the infeed system serves as a store or as a stock of auxiliary joining elements. After receiving the respective auxiliary joining elements, the latter then by way of the positioning unit may be fixed to the composite panel and optionally to the further component. For example, the infeed system may always make available two auxiliary joining elements simultaneously. On account thereof, a tongs of the positioning unit may receive two (mutually opposite) auxiliary joining elements, for example, without a large temporal effort in that each tongs leg receives one auxiliary joining element, for instance.

In some example methods, the at least one auxiliary joining element when receiving the at least one auxiliary joining element may be positioned relative to the positioning unit by way of a guiding system. On account thereof, the accuracy in receiving the auxiliary joining elements by the positioning unit may be enhanced such that increased process reliability is ultimately achieved. In particular, the positioning unit per se may be designed in a correspondingly simple manner on account thereof, since the guiding system already brings about accurate receiving of the auxiliary joining element. The positioning unit, in particular a tongs of the positioning unit, may have a receptacle region, for example, by way of which the auxiliary joining elements may be received. The relative mutual position of the respective guide element and of the receptacle region of the positioning unit may then be positioned by the guiding system such that the auxiliary joining element may be accurately received by the positioning unit.

For example, the guiding system may comprise a delimitation so as to delimit the movement of the receptacle region of the positioning unit and/or of the auxiliary joining element in one or a plurality of directions and to thus mutually align the receptacle of the positioning unit and the auxiliary joining element. The infeed system may comprise the guiding system, for example.

In some example methods, the positioning unit may receive the at least one auxiliary joining element in an at least partially magnetic manner. The respective auxiliary joining element here may adhere in a magnetic manner to the receptacle region of the positioning unit, and may be conveyed until being fixed to the composite panel or to the further component. To this end, the positioning unit may comprise a magnetic claw or a magnetic gripper, for instance. For example, the positioning unit in the respective receptacle region may comprise one or a plurality of magnetic elements, in particular, one or a plurality of magnetic pins.

To this end, the auxiliary elements may be at least partially composed of a magnetizable material such as a ferromagnetic material, for example, iron or an iron alloy.

In some example methods, the at least one further component may be a composite panel or a solid panel. Joining of two composite panels may be carried out in a significantly more efficient manner in a reliable process by way of the method. In this case, one or a plurality of auxiliary joining elements may be not only provided on the one composite panel, but one or a plurality of auxiliary joining elements may also be provided on the further component that is likewise configured as a composite panel.

In some examples, if the further component is a solid panel, no auxiliary joining elements are provided on the side of the solid panel, but auxiliary joining elements may be provided exclusively on the side of the composite panel. It may be sufficient for the auxiliary joining elements to be provided only on one side. This in particular opens up the potential of employing further joining methods in which accessibility to the components in the joining region is necessary from at least one side, for example.

In some example methods, an adhesive layer may be provided between the composite panel and the at least one further component. On account thereof, process reliability may be further enhanced since not only positioning and fixing of the at least one auxiliary joining element in relation to the composite panel (or in relation to the further component, respectively) is performed but fixing of the composite panel to the further component is moreover performed. Moreover, the adhesive layer additionally supports the connection between the composite panel and the further component that has been achieved by joining.

In some example methods, the composite panel in the region of the at least one auxiliary joining element may be thermally joined to the at least one further component, in particular by way of resistance welding. Quality and process reliability may be enhanced in particular by resistance welding. This is because the welding process in the case of resistance welding may advantageously be influenced by the at least one auxiliary joining element. For example, the heat input into the composite panel via the auxiliary joining elements may be designed in a manner suitable to requirements so as to avoid damage to the intermediate layer, for example. On the other hand, a sufficient amount of heat may also be introduced into the intermediate layer on demand so that the latter may melt, enabling contact between the cover layers and thus enabling welding of the cover layers. One example type of resistance welding is resistance spot welding.

To this end, a welding unit, in particular a resistance welding unit may be provided, for example. The latter may comprise, for example, a first welding electrode (facing or assigned to the composite panel) and a second welding electrode (facing or assigned to the further component). The first welding electrode, assigned to the composite panel, may then contact the at least one auxiliary joining element, for example, which may be fixed to the composite panel, without there being any risk such as slippage. The second welding electrode, assigned to the further component, may then directly contact the further component, for example, or likewise an auxiliary joining element, in as far as an auxiliary joining element may also be fixed to the side of the further component.

In the case of resistance welding a pre-heating current may flow first, followed by a welding current. The pre-heating current serves for heating the non-metallic intermediate layer in the form of a thermoplastics material layer and to soften the latter such that the cover layers can be compressed. Subsequently, the composite panel by way of the welding current may be joined to the further component. Here, the pre-heating current and/or the welding current may flow by way of the respective auxiliary joining element.

The pre-heating current may flow by way of an electrical bridge or by way of a parallel connection. Thus a closed electrical circuit may also be provided at that point in time at which the cover layers of the composite panel are still separated by the non-metallic intermediate layer. For example, an electrical bridge between an auxiliary joining element that is disposed on the composite panel and the further component that is configured as a solid panel, for instance, may be provided so as to bypass the composite panel. For example, a parallel connection that contacts an auxiliary joining element may be disposed on the composite panel serves for bypassing the composite panel and the further component may likewise be configured as a composite panel, for example.

In some example methods, the composite panel in the region of the at least one auxiliary joining element may be mechanically joined to the at least one further component, such as by punch riveting or screwing, for instance. Accurate fixing of auxiliary joining elements may be advantageous not only in the case of thermal joining methods but also in the case of mechanical joining methods for composite panels. Additional stability may be offered to the composite panels by the auxiliary joining elements, resulting in enhanced process reliability.

Herein, a respective mechanical connection element such as a semi-tubular punch rivet, a solid punch rivet, or a screw, may penetrate the further component and the composite panel from the side of the further component. The mechanical connection element may be introduced opposite the auxiliary joining element that is fixed to the composite panel into the further component, until said mechanical connection element joins the further component to the composite panel.

In the case of screwing, flow drill screwing (FDS) may be employed. Herein, an FDS screw may be screwed into the solid material. The material may be heated by the screw such that the screw is able to penetrate the material and to furrow a thread, so as to ultimately tighten the screw.

In the case of mechanical joining, an auxiliary joining element may be disposed only on one side of the composite panel. Simplified accessibility on the side of the further component (for example a solid panel or likewise a composite panel) results on account thereof.

A combination of thermal and mechanical joining is also possible.

In some example methods, a plurality of auxiliary joining elements may be fixed to the composite panel by way of the positioning unit. On account of the auxiliary joining elements being fixed to the composite panel, fixing of a plurality of auxiliary fixing elements may also be carried out first, for example, so that joining may subsequently be performed without unnecessary interruptions. Likewise, a plurality of auxiliary joining elements may be fixed to the further component by way of the positioning unit.

In some example methods, at least one auxiliary joining element may be fixed to the further component by way of the positioning unit, in particular so as to be opposite the at least one auxiliary joining element on the composite panel. On account thereof, influencing the joining region on the side of the further component may be achieved. This is particularly advantageous when the further component likewise is a composite panel, and/or in the case of thermal joining.

Fixing the at least one auxiliary joining element to the further component may be performed here as has been described above with reference to fixing to the composite panel.

According to another teaching of the present disclosure, the object mentioned at the outset may also be achieved by a device having a positioning unit that is adapted for bringing to bear at least one auxiliary joining element on the composite panel and for fixing the former to the composite panel, and having a joining unit for joining the composite panel in the region of the at least one auxiliary joining element to the at least one further component.

Due to the positioning unit that brings to bear not only the auxiliary joining element or the auxiliary joining elements, respectively, on the composite panel, but also fixes the former to the composite panel, positioning and fixing auxiliary joining elements may be carried out not only very efficiently but also in a highly accurate manner.

As has already been disclosed, the positioning unit may have one or a plurality of magnetic elements such as, for example, magnetic pins, so as to receive the auxiliary joining elements in a receptacle region.

In some examples, the device may further comprise an infeed system for providing auxiliary joining elements, wherein the infeed system comprises in particular a guiding system that when receiving the at least one auxiliary joining element serves for positioning the at least one auxiliary joining element relative to the positioning unit.

In terms of further advantageous example devices, reference is made to the description of the method and to the advantages described therein.

By way of the preceding and the following description of method steps according to various examples, corresponding means for carrying out the method steps by devices are also disclosed. Likewise, by disclosing means for carrying out a method step, the corresponding method step is to be disclosed.

Figure 1A:
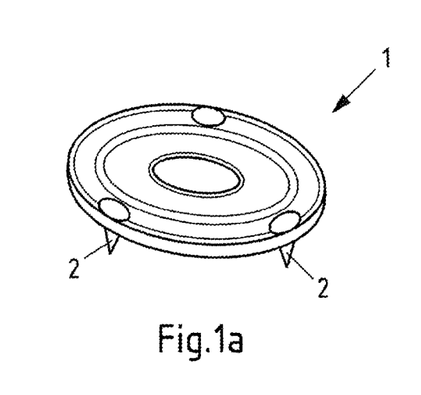
FIG. 1a is a perspective view of an example auxiliary joining element.

With reference now to the figures, FIG. 1a is a perspective view of an example of an auxiliary joining element 1. The auxiliary joining element 1 in this case may be manufactured from metal, for example from steel, and has a substantially flat plate-shaped geometry. A plurality of fixing elements 2 that serve for fixing the auxiliary joining element 1 to a composite panel or to another component may be disposed on the lower side of the auxiliary joining element 1. The fixing elements 2 here may be configured in a spike-shaped manner so as to penetrate the composite panel or component.

Figure 1B:
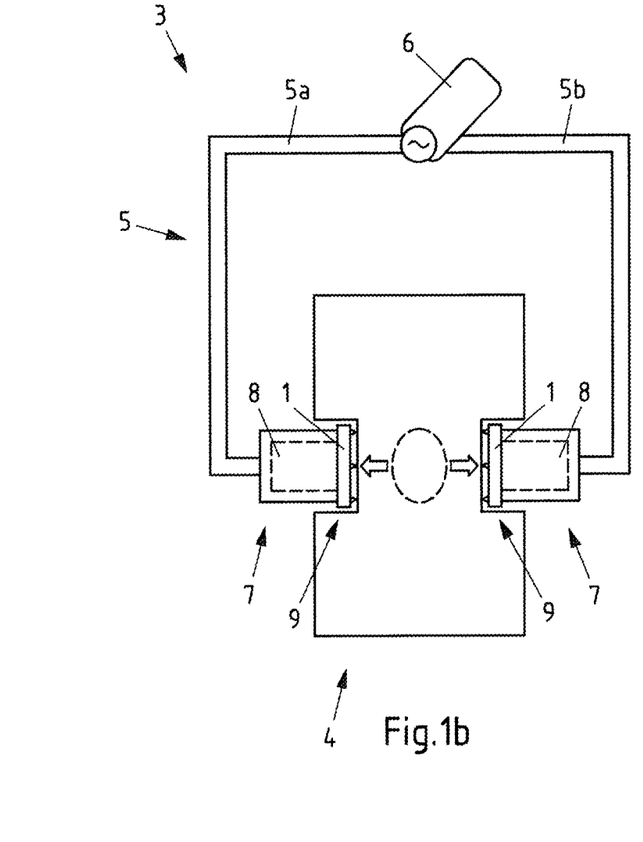
FIG. 1b is a schematic side view of an example positioning unit and an example infeed system.

FIG. 1b shows a schematic side view of an example of a positioning unit 3 and of an infeed system 4. The positioning unit 3 may comprise a tongs 5 having two tongs legs 5a, 5b, and a positioning arm 6 in the form of a robotic arm. The tongs legs 5a, 5b may each have one receptacle region 7 that serves for receiving in each case one auxiliary joining element 1. To this end, the receptacle regions 7 may each have one magnetic pin 8 that serves for magnetically receiving the respective auxiliary joining element 1.

The infeed system 4 may comprise a supply of auxiliary joining elements 1. The receptacle regions 7 and/or the auxiliary joining elements 1 may be guided by a guiding system 9. Said guiding here may be performed by a delimitation that restricts the movement of the receptacle regions 7 and/or of the auxiliary joining elements 1. On account thereof, the auxiliary joining elements 1 when being received may be aligned in relation to the receptacle regions 8. The auxiliary joining elements 1 by way of the positioning unit 3 may subsequently be conveyed to the components to be joined.

Figure 1C:
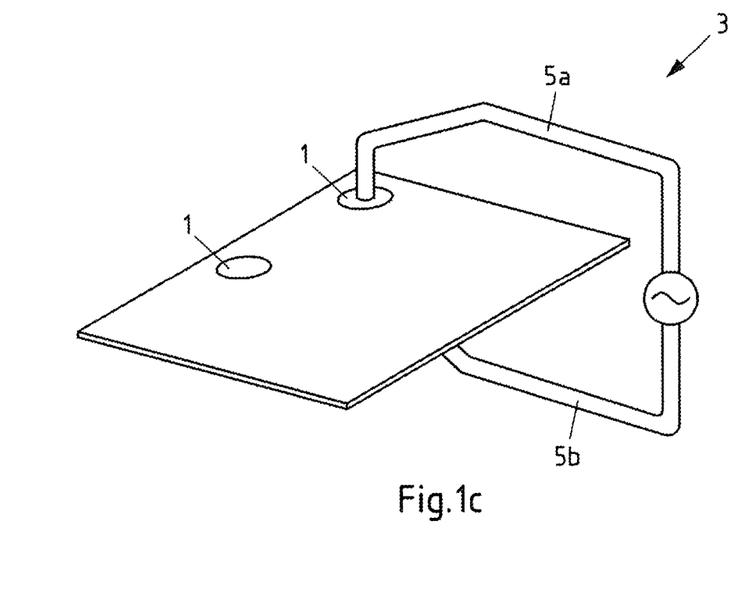
FIG. 1c is a perspective schematic view of example auxiliary joining elements being placed and fixed.

To this end, FIG. 1c is a perspective schematic view of an example of placing and fixing the auxiliary joining elements 1. By way of the tongs 5, the auxiliary joining elements 1 cannot only be placed accurately on the components to be joined and be brought to bear thereon, but can also be fixed thereto, as will be described in more detail in the context of FIG. 2.

Figure 2:
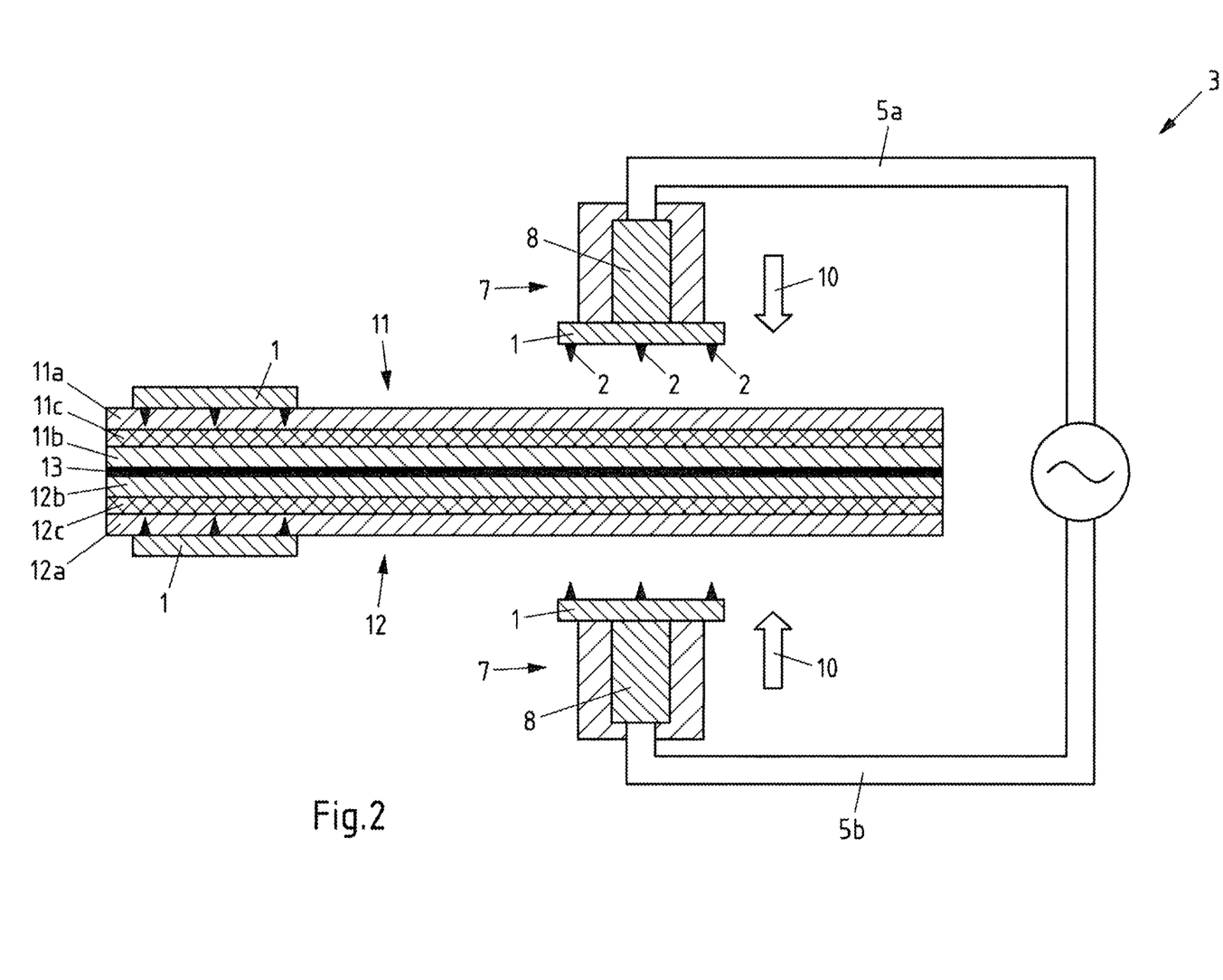
FIG. 2 is a schematic sectional view of the example auxiliary joining elements being placed and fixed in FIG. 1c.

To this end, FIG. 2 shows a schematic sectional view of the placing and fixing of the auxiliary joining elements 1, as illustrated in FIG. 1c). The auxiliary joining elements 1 may be magnetically held by the magnetic pins on the receptacle regions 7 of the respective tongs legs 5a, 5b, and in the direction of the arrows 10 may be pushed onto both sides of the components 11, 12 to be joined. The auxiliary joining elements 1 here may be disposed in pairs so as to be mutually opposite.

The components to be joined here may be a composite panel 11 and a further component 12, which in this example is likewise configured as a composite panel. The composite panel 11 may have two external metallic cover layers 11a, 11b, and an interdisposed non-metallic intermediate layer 11c, the latter in this case being a thermoplastics material layer. The further component 12 in this case may be identically configured, in an analogous manner having the metallic cover layers 12a, 12b and the intermediate layer 12c. For more reliable relative placing and in order to achieve better joining results, the composite panel 11 and the further component 12 may be connected in a materially integral manner to an interdisposed adhesive layer 13.

The auxiliary joining elements 1 by way of the fixing elements 2 may be connected in a form-fitting and force-fitting manner to the respective component 11, 12. The fixing elements 2 here penetrate the respective external cover layers 11a, 12a that respectively face the former. The fixing elements 2 may reach up to the respective intermediate layer 11c or 12c, respectively, for example. The auxiliary joining elements 1 may be brought to bear accurately on the composite panel 11 or on the further component 12 and fixed thereto, respectively, in a simple manner.

Figure 3A:
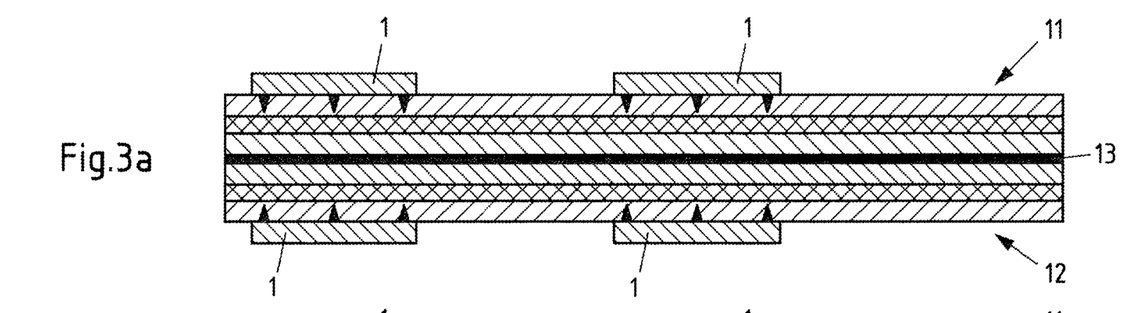
FIG. 3a is a schematic sectional view of an example two-sided assembly of auxiliary joining elements.
Figure 3B:
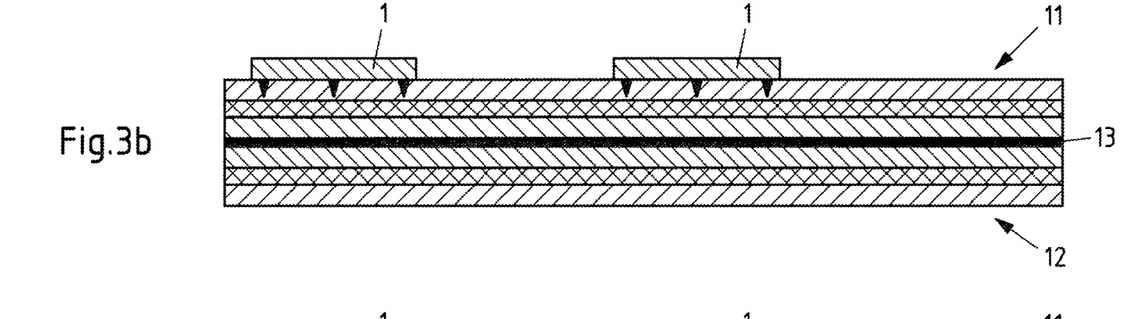
FIG. 3b is a schematic sectional view of an example one-sided assembly of auxiliary joining elements.
Figure 3C:
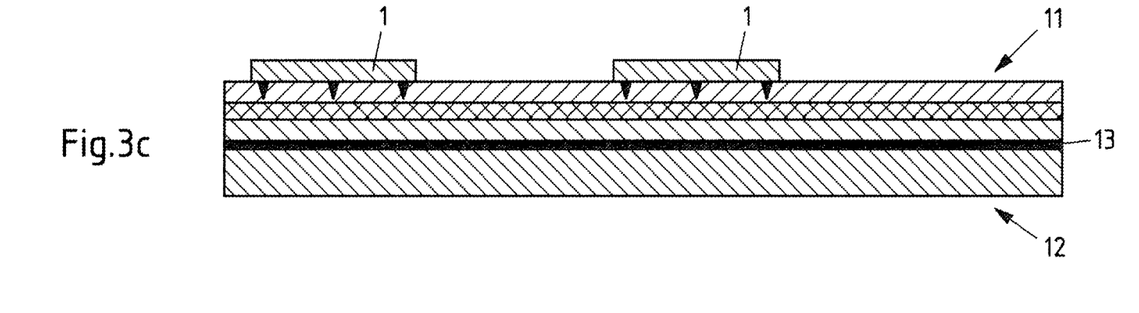
FIG. 3c is a schematic sectional view of an example one-sided assembly of auxiliary joining elements with an example further component in the form of a solid panel.

FIGS. 3a-c are schematic sectional views of various example assemblies of auxiliary joining elements 1. FIG. 3a shows a two-sided assembly of auxiliary joining elements 1, as has already also been shown in FIG. 2. The further component 12 here may likewise be configured as a composite panel, and the auxiliary joining elements 1 may be disposed on both sides so as to be mutually opposite. In the example shown in FIG. 3b the auxiliary joining elements 1 are disposed only on one side and, in particular, only on the side of the composite panel 11, but not on the side of the further component 12. The auxiliary joining elements 1 in FIG. 3c are likewise disposed on only one side, as in FIG. 3b. As opposed to FIG. 3b, however, the further component 12 here may be configured as a solid panel. The composite panel 11 and the further component 12 in the three examples shown may be in each case connected by way of an adhesive layer 13. The adhesive layer 13 is not required, however.

Figure 4:
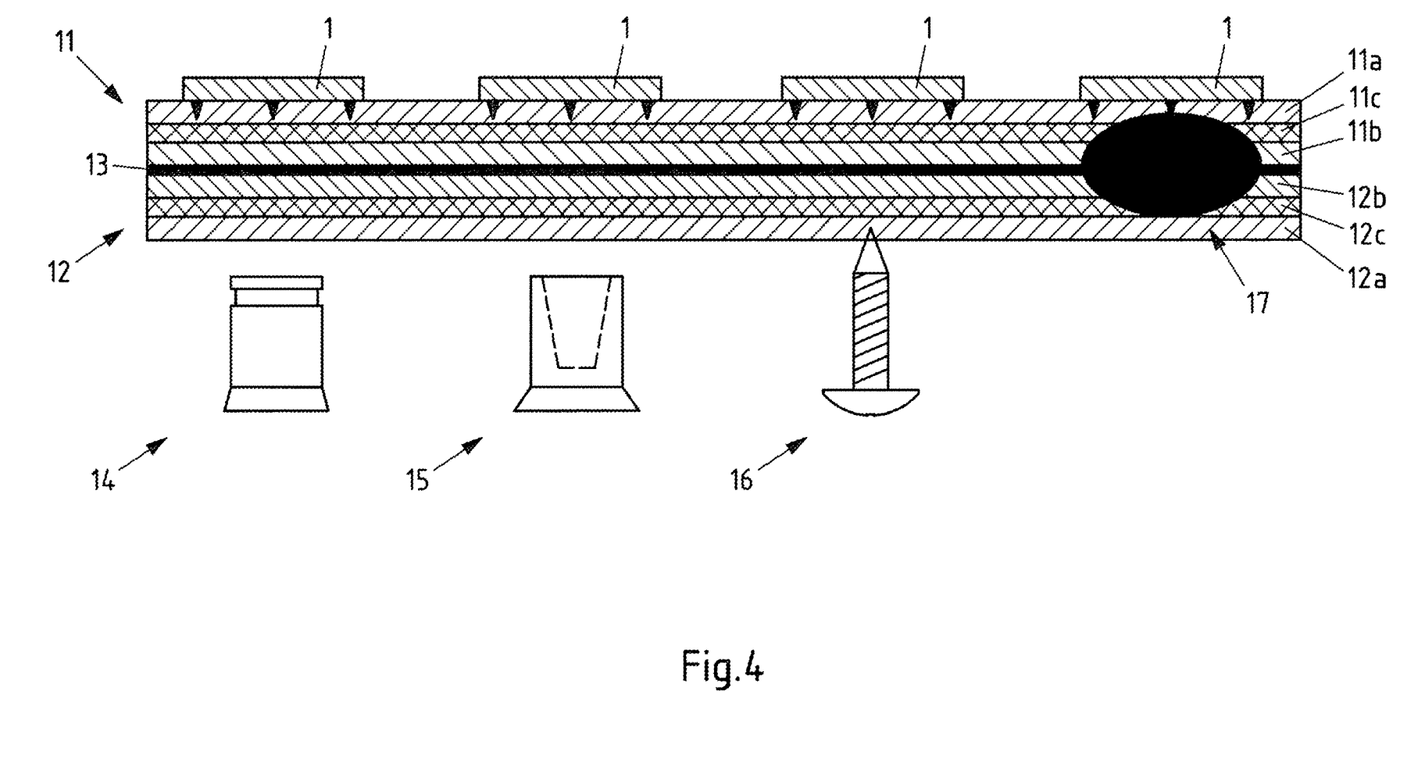
FIG. 4 is a schematic sectional view illustrating various example joining procedures.

FIG. 4, in an exemplary manner, shows various joining techniques in a schematic sectional view. The scenario shown in FIG. 3b, in which a composite panel 11 is to be joined to a further component 12 that is configured as a composite panel, and in which the auxiliary joining elements may be fixed to one side of the composite panel 11 is illustrated in an exemplary manner. In order for the composite panels 11, 12 to be mechanically joined, a solid punch rivet 14 for solid-punch riveting may be used, for example. A semi-tubular punch rivet 15 for semi-tubular punch riveting may likewise be used. A screw 16 for screwing, for example, by way of flow drill screwing, may likewise be used. In this case, the respective mechanical connection element 14, 15, 16 may be introduced from the side of the further component 12. In order to thermally join the composite panels 11, 12 a welding lens 17 can be generated by way of resistance welding. One of the joining techniques illustrated can be chosen, for example, to connect the components 11, 12 to one another at a plurality of locations. Various joining techniques can, however, also be combined.

Figure 5A:
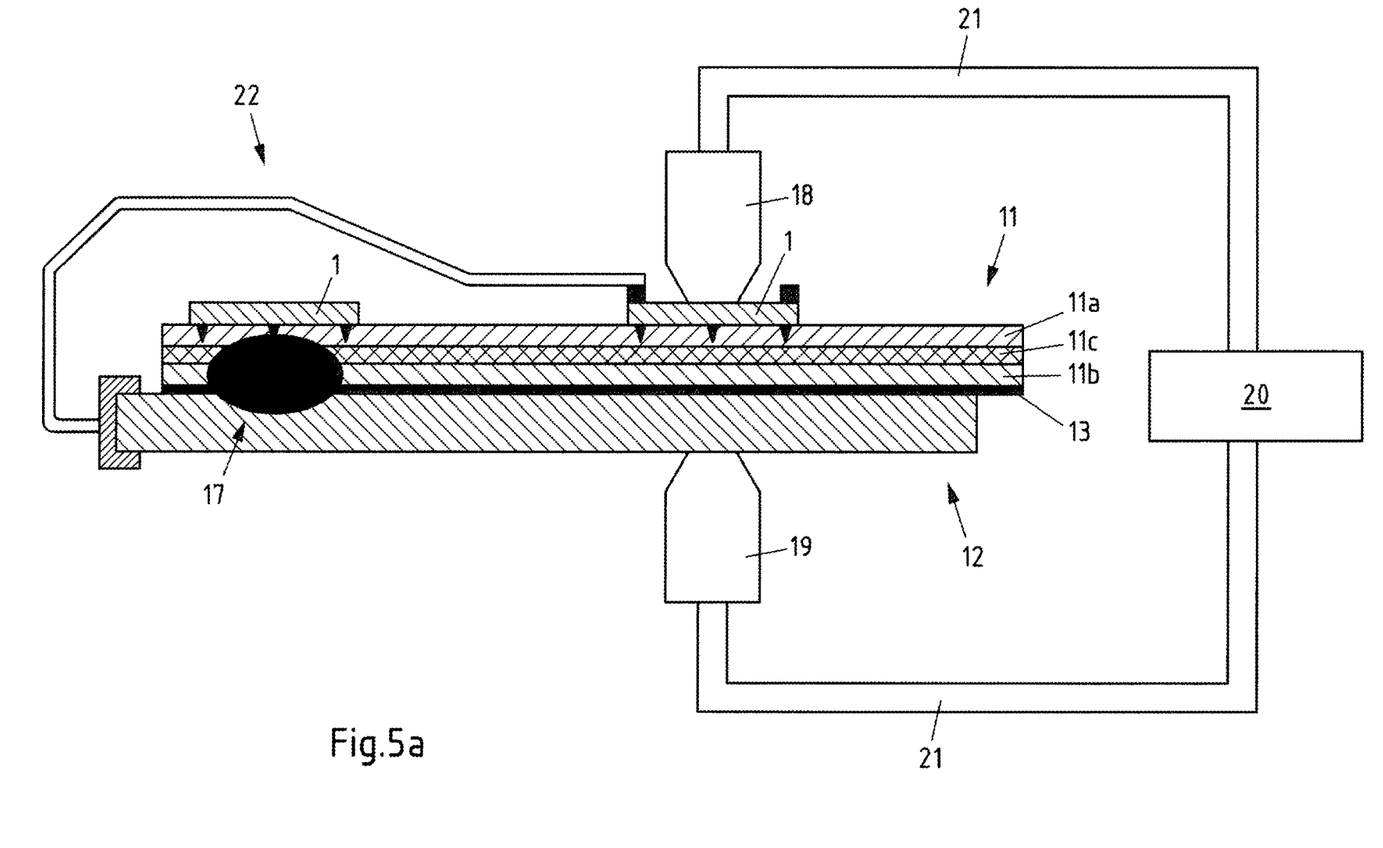
FIG. 5a is a schematic sectional view illustrating an example thermal joining procedure.
Figure 5B:
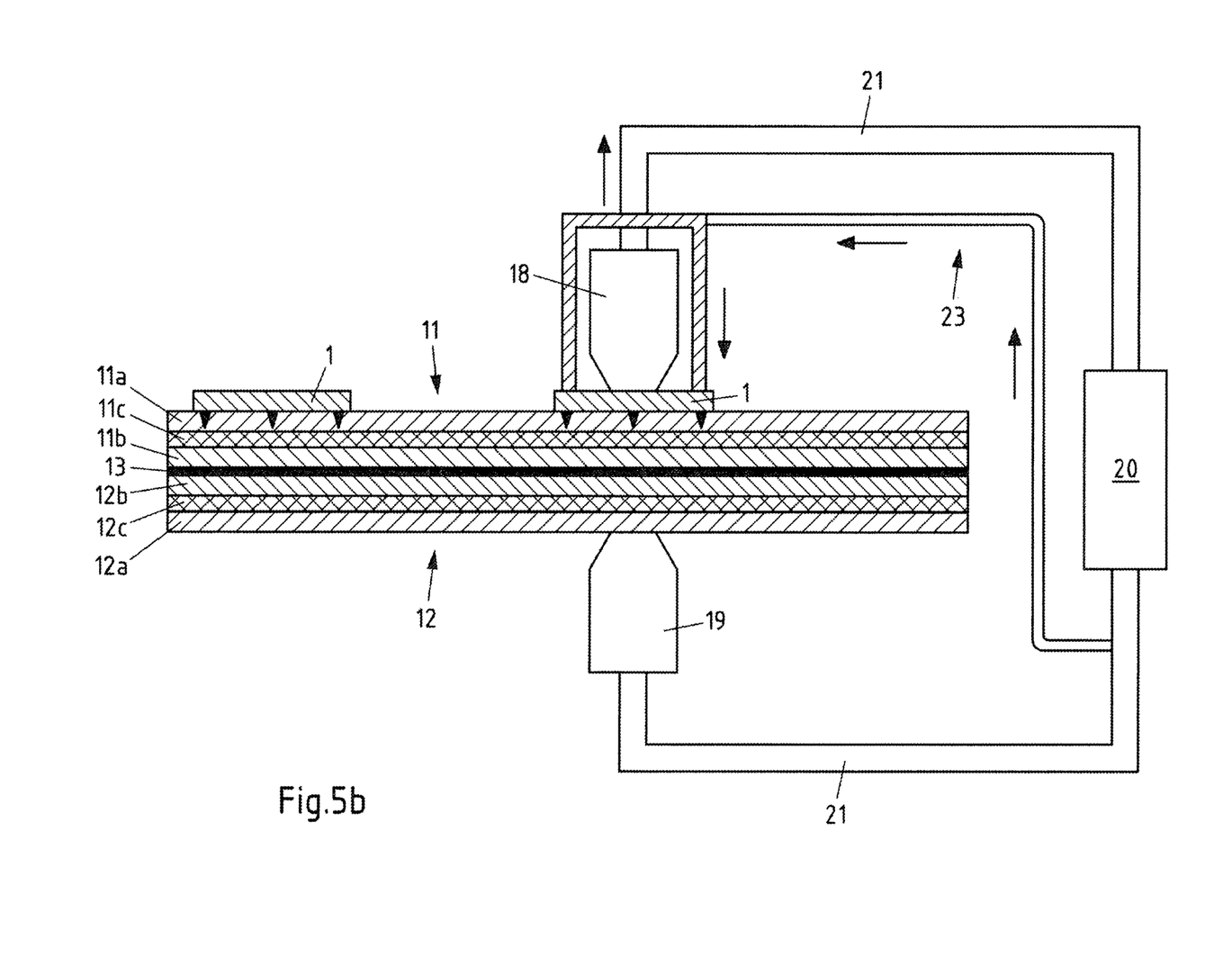
FIG. 5b is a schematic sectional view illustrating another example thermal joining procedure.

FIGS. 5a, b now show various examples of thermal joining procedures in schematic sectional view. Herein a composite panel may be joined to a solid panel, as shown in FIG. 3c. To this end, a first welding electrode 18 and a second welding electrode 19 may be provided. The first welding electrode 18 may contact directly the right-hand auxiliary joining element 1, which may be connected to the composite panel 11. The second welding electrode 19, opposite the first welding electrode 18, may contact directly the further component 12 (the solid panel). By way of lines 21 the welding electrodes 18, 19 may be connected to a power source 20. Furthermore, an electrical bridge 22 may connect the right auxiliary joining element 1 with the further component 12. On account thereof, a pre-heating current bypassing the composite panel 11 may flow, heating and softening the isolating intermediate layer 11a such that by impinging the composite panel with force by way of the welding electrode 18 the cover layers may be brought into contact. This by way of a welding current then enables resistance welding of the composite panel 11 to the further component 12. The already joined state is illustrated by way of the welding lens 17 in the region of the left-hand auxiliary joining element 1.

As opposed to FIG. 5a, in the example of FIG. 5b a composite panel 11 may be joined to a further composite panel as the further component 12, wherein again auxiliary joining elements 1 may be provided only on one side (cf. FIG. 3b). The first welding electrode 18 on the side of the composite panel 11 may again contact one of the auxiliary joining elements 1, and the second welding electrode 19 may contact the composite panel 12. As opposed to FIG. 1, no electrical bridge, but a parallel connection 23 may be provided by way of which the respective auxiliary joining element 1, bypassing both composite panels 11, 12 and the second welding electrode 19, may be connected with the lines 21. On account thereof, an electrical circuit via the parallel connection 23, the contacted auxiliary joining element 1, and the first welding electrode 18 may be created such that a pre-heating current may flow therethrough and that the cover layers 11a, 11b, 12a, 12b may contact one another by virtue of the softening of the intermediate layers 11c 12c. Welding may be again performed by way of a welding current by way of the first and the second welding electrodes 18, 19 and by way of the composite panels 11, 12.

Figure 6A:
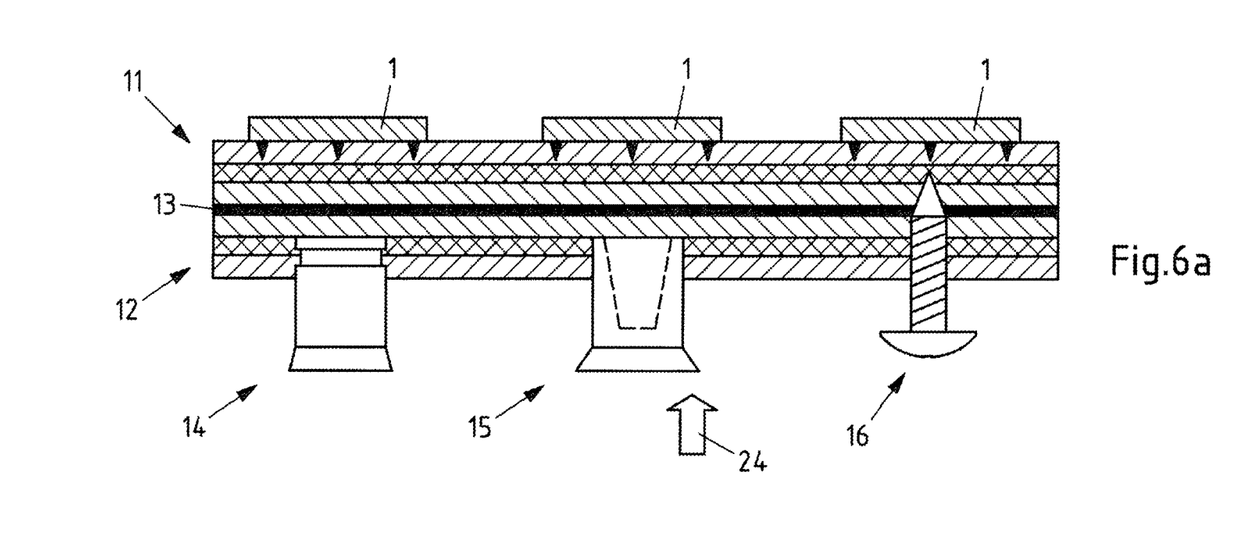
FIG. 6a is a schematic sectional view illustrating an example mechanical joining procedure.
Figure 6B:
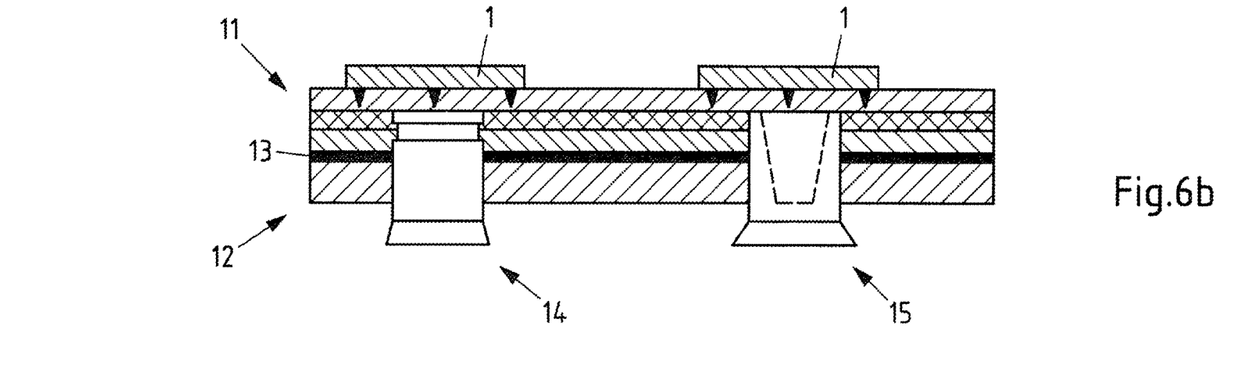
FIG. 6b is a schematic sectional view illustrating another example mechanical joining procedure.

FIGS. 6a, b show various examples of mechanical joining procedures in schematic sectional view. The joining unit for impinging the mechanical connection means with a force is not illustrated. As has already been explained in the context of FIG. 4, the mechanical joining procedures may be implemented by punch riveting or screwing, in particular. To this end, the solid punch rivet 14, the semi-tubular punch rivet 15, and the screw 16 of FIG. 4 are shown in FIG. 6a. The former may have (at least partially) penetrated the panels 11, 12. By impinging the mechanical connection elements 14, 15, 16 with a force in the joining direction 24, mechanical joining of the panels 11, 12 may ultimately be enabled.

FIG. 6b in an exemplary manner shows two examples of mechanical joining procedures in the case of a combination of components as has already been illustrated in FIG. 3c, where the further component 12 may be a solid panel. However, as can be seen, at the stage shown the solid punch rivet 14 or the semi-tubular punch rivet 15, respectively, has penetrated up to the region of the topmost cover layer 11a of the composite panel 11 such that the panels 11, 12 have been joined in the regions of the auxiliary joining elements 1.

Finally, those having ordinary skill in the art will understand that reciting "a" element or "an" element in the appended claims does not restrict those claims to articles, apparatuses, systems, methods, or the like having only one of that element.

What is claimed is:

1. A method for joining a composite panel to a component, wherein the composite panel comprises a non-metallic intermediate layer disposed between two external metallic cover layers, the method comprising:
   positioning the composite panel and the component such that the composite panel and the component are at least partially overlapping;

using a positioning unit to bring an auxiliary joining element to bear on the composite panel and to fix the auxiliary joining element to the composite panel; and joining the composite panel in a region of the auxiliary joining element to the component;

wherein:

the positioning unit receives the auxiliary joining element in an at least a partially magnetic manner;

the composite panel is at least one of punch riveted or screwed to the component in an area of the component opposite the region of the auxiliary joining element; and the auxiliary joining element is disc-shaped or plate-shaped.

2. The method of claim 1 wherein the auxiliary joining element is fixed to the composite panel in a way that creates at least one of a form-fitting connection or a force-fitting connection between the auxiliary joining element and the composite panel.

3. The method of claim 1 wherein:

the auxiliary joining element is fixed to the composite panel by a fixing element that is disposed on a side of the auxiliary joining element that faces the composite panel; and the fixing element is configured as a protrusion.

4. The method of claim 1 wherein the positioning unit comprises at least one of a positioning arm or tongs.

5. The method of claim 1 wherein the positioning unit receives the auxiliary joining element from an infeed system.

6. The method of claim 1 further comprising using a guiding system to position the auxiliary joining element relative to the positioning unit.

7. The method of claim 1 wherein the component comprises a composite panel or a solid panel.

8. The method of claim 1 further comprising providing an adhesive layer between the composite panel and the component.

9. The method of claim 1 wherein the composite panel in the region of the auxiliary joining element is resistance welded to the component.

10. The method of claim 1 wherein the auxiliary joining element is a first auxiliary joining element, the method further comprising using the positioning unit to fix a second auxiliary joining element to the composite panel.

11. The method of claim 1 further comprising using the positioning unit to fix an auxiliary joining element to the component at a location opposite the auxiliary joining element fixed to the composite panel.

12. The method of claim 3, wherein the auxiliary joining element comprises a plurality of fixing elements.

13. The method of claim 12, wherein the fixing elements are spike-shaped.

14. The method of claim 13, wherein the fixing elements penetrate one of the composite panel external metallic cover layers to reach the non-metallic intermediate layer when the auxiliary joining element is fixed to the composite panel.

15. A method for joining a composite panel to a component, wherein the composite panel comprises a non-metallic intermediate layer disposed between two external metallic cover layers, the method comprising:

positioning the composite panel and the component such that the composite panel and the component are at least partially overlapping;

using a positioning unit to bring an auxiliary joining element to bear on the composite panel and to fix the auxiliary joining element to the composite panel; and joining the composite panel in a region of the auxiliary joining element to the component;

wherein:

the positioning unit receives the auxiliary joining element in an at least a partially magnetic manner;

the auxiliary joining element is fixed to the composite panel by a plurality of spike-shaped fixing elements disposed on a side of the auxiliary joining element that faces the composite panel;

each of the plurality of spike-shaped fixing elements penetrates one of the composite panel external metallic cover layers to reach the non-metallic intermediate layer when the auxiliary joining element is fixed to the composite panel; and the auxiliary joining element is disc-shaped or plate-shaped.

* * * * *